United States Patent [19]
Simard

[11] Patent Number: 5,190,341
[45] Date of Patent: Mar. 2, 1993

[54] RIGID COVER ASSEMBLY FOR OPEN TOP BOX BODY

[76] Inventor: Claude J. M. Simard, 43 Bossé, Chicoutimi, Quebec, Canada, G7J 1K9

[21] Appl. No.: 808,572

[22] Filed: Dec. 17, 1991

[51] Int. Cl.⁵ .................................................. B60P 7/02
[52] U.S. Cl. ..................................... 296/100; 296/181; 105/377; 49/340
[58] Field of Search ................. 296/100, 181; 105/355, 105/377; 49/339, 340

[56] References Cited

U.S. PATENT DOCUMENTS

| | | | |
|---|---|---|---|
| 3,061,364 | 10/1962 | Tantlinger et al. | 296/100 |
| 3,106,900 | 10/1963 | Gallo et al. | 105/377 X |
| 3,183,873 | 5/1965 | Hamilton | 49/340 X |
| 3,485,524 | 12/1969 | Nelson | 296/100 |
| 3,617,089 | 11/1971 | Tyler | 296/100 X |
| 3,913,969 | 10/1975 | Hoch | 296/100 |
| 4,767,152 | 8/1988 | Stluka et al. | 296/100 |

FOREIGN PATENT DOCUMENTS

597727  9/1959  Italy ..................................... 296/100

Primary Examiner—Dennis H. Pedder
Attorney, Agent, or Firm—Roland L. Morneau

[57] ABSTRACT

A rigid cover assembly for use on an open top box body is particularly adapted for trucks carrying loose goods. The cover assembly has an arched shape lid within which are located tilted piston devices for pivoting the cover assembly over the box body. The piston devices extend between the top edges of the front and the rear wall of the box body up to locations inside the lid adjacent the respective front and rear walls. The lid is provided with openings for loading the box body with loose goods.

10 Claims, 11 Drawing Sheets

RIGID COVER ASSEMBLY FOR OPEN TOP BOX BODY

BACKGROUND OF THE INVENTION

1. Field of the Invention

This invention relates to a rigid cover assembly for truck body box and stationary open top box provided with an internally mounted hinged system for closing and opening the cover assembly. The cover assembly, which is mounted on a box body carrying loose goods, is provided with access doors through its surface. The cover assembly has an arched shape for housing the hinged system.

2. Prior Art

A search of the prior art has failed to reveal pertinent references.

U.S. Pat. No. 3,913,969 discloses a truck body closure including a cover and a pair of pistons mounted outside the truck body and outside the cover. The body closure appears to be intended for rather short trucks considering that the pistons are located at a longitudinal end of the truck body. The pistons operate by contraction to open the cover which is not provided with any openings.

Some prior patents are also directed to roll-up tarp assembly such as disclosed in U.S. Pat. Nos. 4,834,445 and 5,002,328. Such arrangement does not imply a hinged arrangement for a rigid cover.

Other various systems are foreseen for retracting a load bed cover such as disclosed in U.S. Pat. No. 3,874,721 wherein U-shaped frames are adapted to slide on the truck body.

Generally, truck bodies are covered with a flexible material such as tarpauline which are rolled-up or slidden over the top surface of the truck body.

SUMMARY OF THE INVENTION

The cover assembly according to the present invention is intended to be used on an open top box body adapted to carry loose goods. The box body has a surrounding wall and in particular two upstanding lateral walls, each provided with an upper edge. The cover assembly includes a rigid lid and an elogated bracket adapted to sit on and be fixed to the upper edge of one of the lateral walls and a peripheral frame which is mounted above the bracket and the surrounding wall.

A hinged member is secured to the bracket and to a portion of the frame below the bracket. The lid is dome-shaped or arch-shaped secured to the frame for closing the top box body. At least one tilted piston device is connected between the roof portion of the lid and the bracket and includes means for actuating the piston so that the lid can pivot about the hinged member whereby the lid is adapted to open and close the box body. The piston device is preferably housed within the lid. A seal extends between the lid and the box body.

BRIEF DESCRIPTION OF THE DRAWINGS

FIG. 5a is an alternative embodiment of the cover as shown in FIG. 5, FIG. 6a is a view corresponding to FIG. 6 illustration an alternative embodiment, FIG. 7a is a view corresponding to FIG. 7 showing the cover in a raised postiion, FIG. 12 is an enlarged view of the encircled portion 12 shown in FIG. 6a, FIG. 13 is a side view taken along line 13—13 in FIG. 12, FIG. 18 is a top view of a portion of the cover taken along line 18 shown in FIG. 5a, FIG. 19 is a cross-sectional view taken along line 19—19 of FIG. 18, FIG. 19a is a view corresponding to FIG. 19 with the door in an open position.

DETAILED DESCRIPTION OF THE INVENTION

Figures 1, 2, 3:
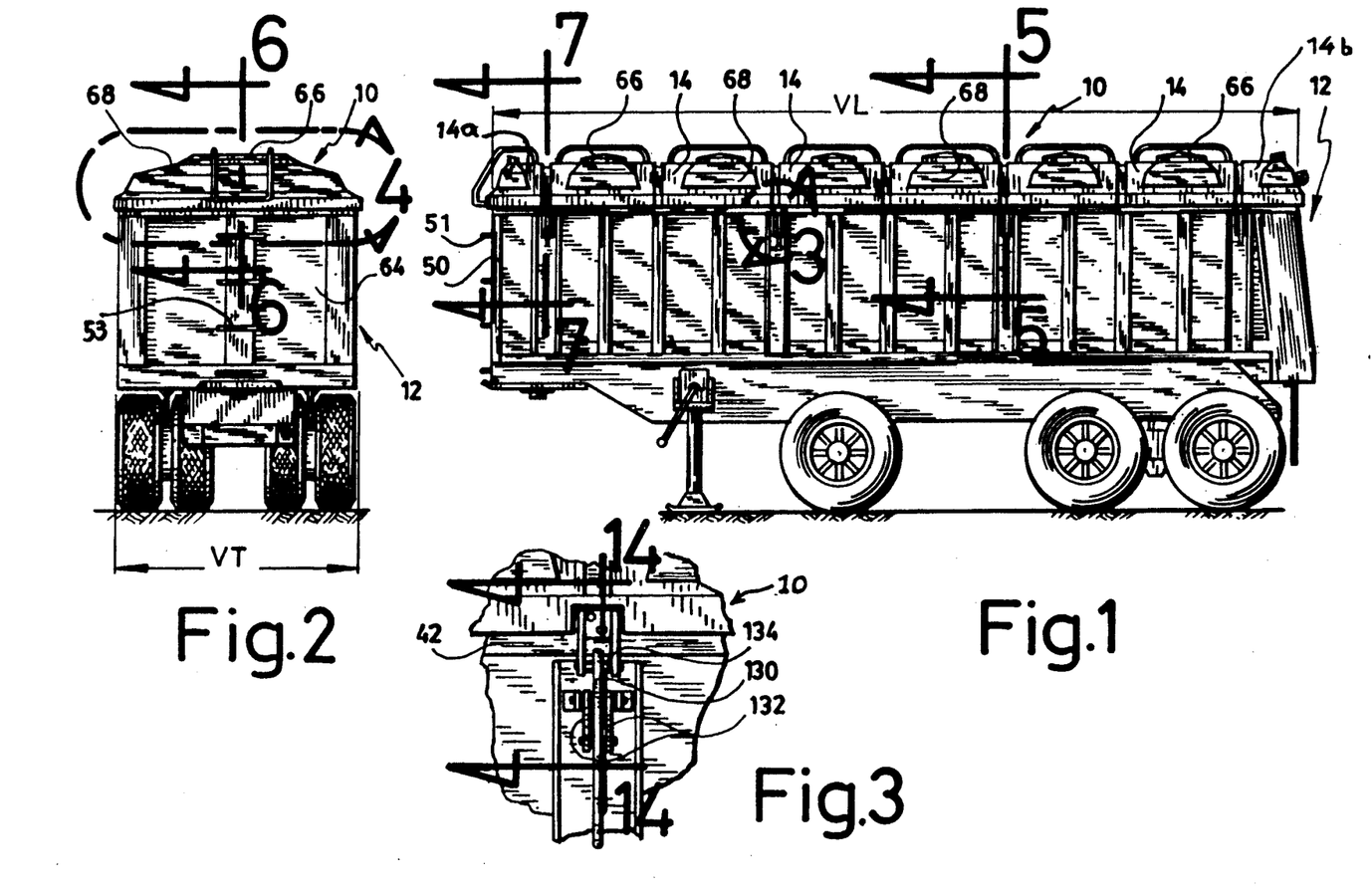
FIG. 1 is an elevation view of a truck box body including a cover assembly according to the invention.
FIG. 2 is a rear view of the body shown in FIG. 1, FIGS. 2a and 2b are rear views of the truck box body of an alternative embodiment with the cover closed and opened respectively.
FIG. 3 is an enlarged view of the encircled portion 3 shown in FIG. 1 illustrating a locking arrangement.

FIG. 1 illustrates a general side view of an open top box body 12 of the type which is adapted to be pulled by a truck and which is covered by a cover assembly 10 according to the present invention. It consists of a rigid lid which is hinged along one of the lateral sides of the box body 12 and adapted to be open with pistons located inside the cover assembly 10. When the cover assembly is in a closed position it is locked to the box body 12 with a locking arrangement as shown in FIG. 1. The box body 12 and its cover assembly 10 may have various lengths VL and various transversal widths VT. The cover assembly 10 and in particular the lid is preferably made of a front module 14a and a rear module 14b and a plurality of intermediate modules 14 which may vary in number according to the length of the box body 12. As further explained later, the cover assembly 10 is provided with a peripheral seal which protects the content of the box body from rain, snow or wind and which can restrict the propagation of odours emanating from the content of the box body.

Figures 2A, 2B, 7A:
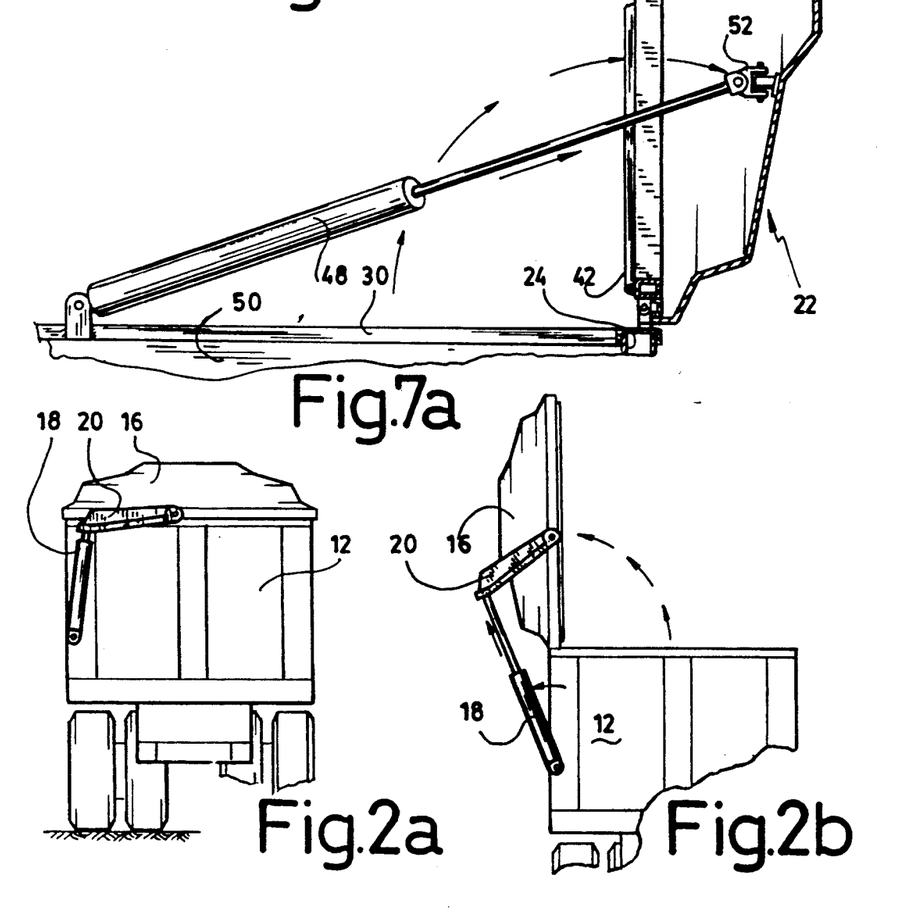
Figure 4:
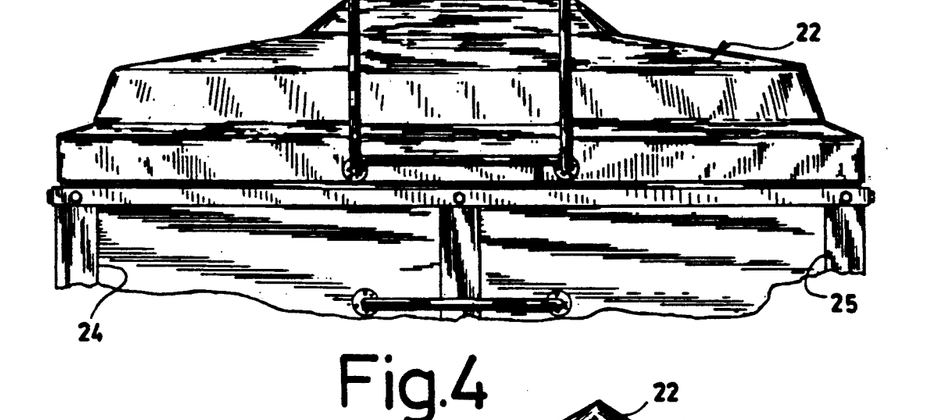
FIG. 4 is an enlarged view of the encircled portion 4 illustrated in FIG. 2.
Figure 4A:
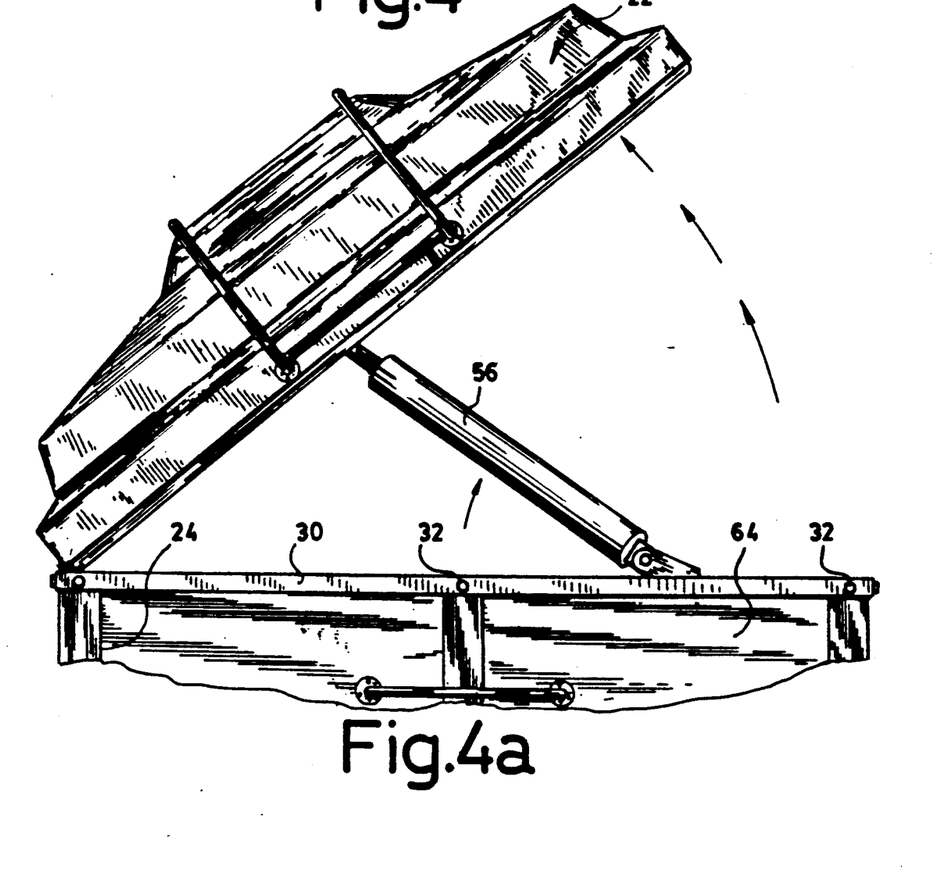
FIG. 4a is a view corresponding to FIG. 4 illustrating the cover in a raised position.

FIGS. 2a and 2b illustrate one embodiment of the invention wherein the lid 16 is pulled upwardly by a piston 18 acting on a lever 20 pivoting about a reinforced portion of the lid 16. When the piston 18 is extended as shown in FIG. 2b, from its position adjacent the box body 12, it raises and subsequently pulls on the lever 20 which pivots the lid into its open position.

Figures 5, 8, 9B, 9C:
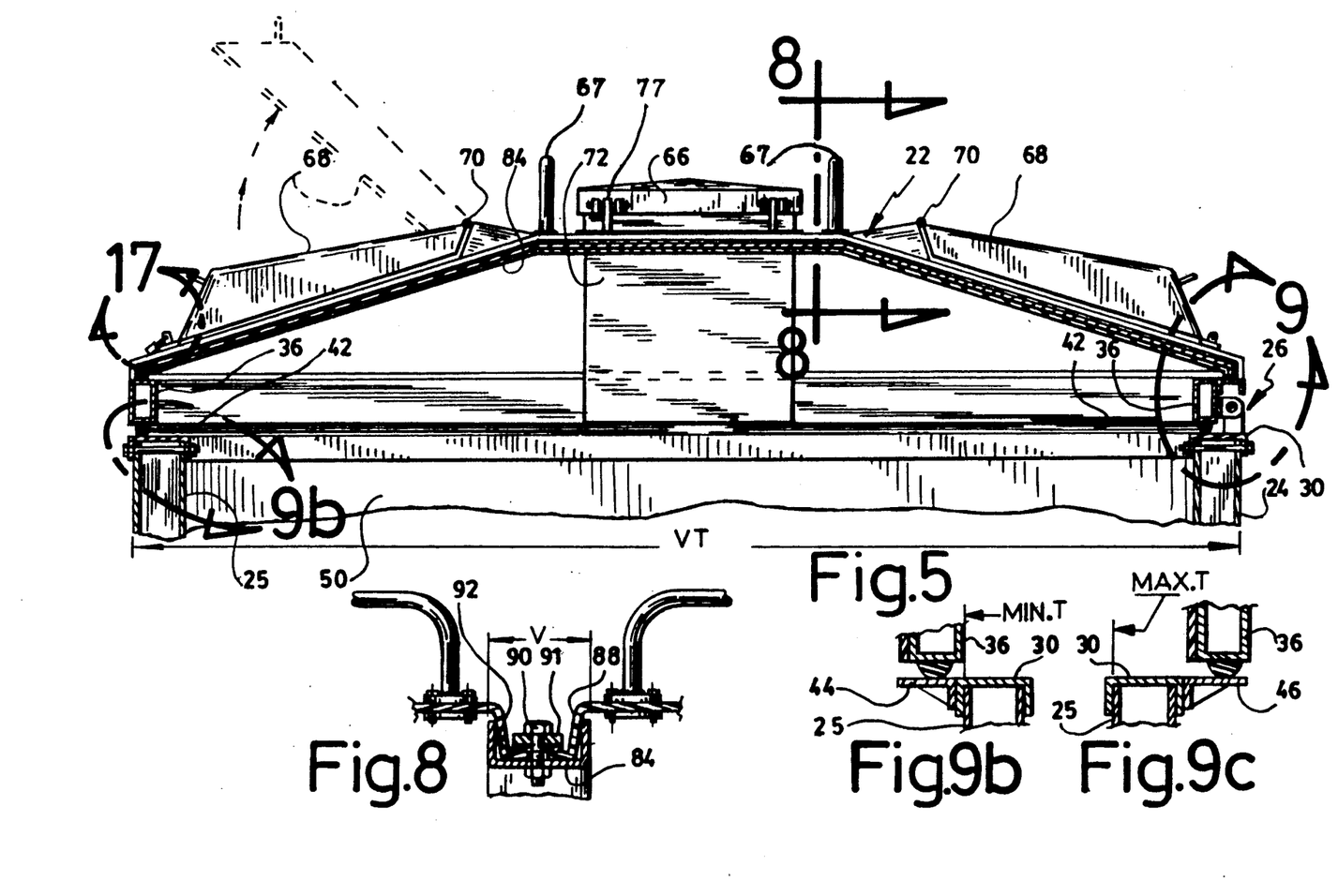
FIG. 5 is a cross-sectional view of the cover taken along line 5—5 of FIG. 1 showing an intermediate module.
FIG. 8 is a cross-sectional view of connecting means between two adjacent modules taken along line 8—8 of FIG. 5, FIGS. 9 and 9a show enlarged views of the encircled portions 9 shown in FIG. 5 and 9a shown in FIG. 5a respectively.
FIGS. 9b and 9c are cross-sectional views of two alternative embodiments of superposed joints between the cover and the lateral wall of the truck.

A preferred embodiment is illustrated in FIGS. 4, 4a, 5, 7 and 7a. The lid 22 as shown in FIG. 5, is hingedly mounted on the lateral wall 24 through a hinge member 26. the hinge member 26 has one vertical arm 28 welded to a bracket 30 having an upside down U-shape cross-section which is fixed over the upper edge of the peripheral wall of the box body 12. The peripheral wall including the lateral wall 24 is particularly shown in FIG. 9. The bracket 30 is secured to the peripheral wall by a plurality of bolts and nuts 32. The horizontal arm 34 of the hinged member 26 is welded to a peripheral frame 36. A U-shape beam 38 is welded to the side of the frame 36 at a location above the hinged member 26. The lid 22 is secured to the beam 38 through a combination of flanges which are secured by bolts and nuts 40.

The peripheral frame 36 is located above the bracket 30. A resilient seal member 42 is secured to the lower edge of the frame 36 and extends over all the peripheral walls of the box body 12 so as to completely seal the inner space of the box body under the cover 22. The seal 42 is generally made of a synthetic rubber glued or mechanically held to the frame 36.

As shown in FIGS. 9b and 9c, the bracket 30 may be secured to an inner lateral flange 44 or an outer lateral flange 46. The flange 44 is used when the cover is slightly smaller than the peripheral walls within a minimum transversal width and the flange 46 used when the cover exceeds the lateral wall 25 by a maximum transversal width. The minimum and the maximum transversal width are illustrated by the arrows in FIGS. 9b and 9c.

Figure 7:
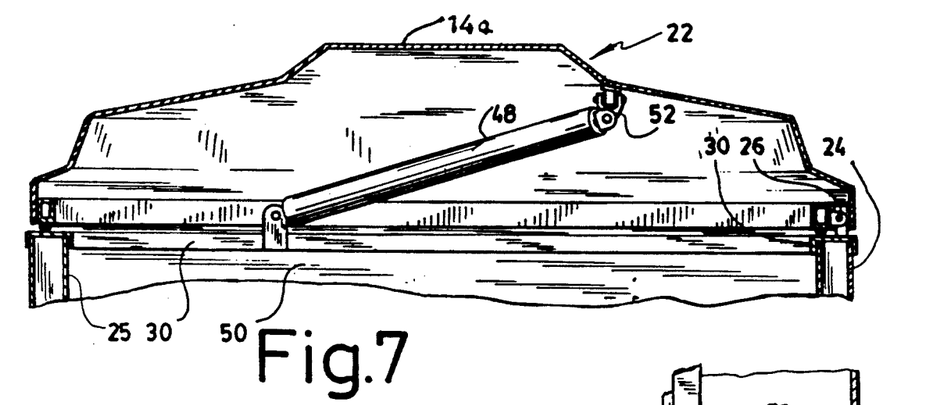
FIG. 7 is a cross-sectional view of the cover taken along line 7—7 of FIG. 1 showing the front module.

The lid 22, as shown in FIGS. 7 and 7a, is lifted by a piston 48 which is secured at its lower end to the portion of the bracket 30 which is secured to the front wall. The upper end of the piston 48 is connected to the front module 14a of the lid 22 through a universal joint 52 secured to the lid 22 at a location longitudinally remote from the front wall 50. A universal joint 52 is used to take into consideration the variation of the angle between the piston 48 and the lid 22 while the latter tilts, by orienting the piston 48 from a front wall to a location on the lid 22 which is rearward of the front wall. A ladder 51 is fixed to the front wall to climb on the cover. A similar ladder 53 is fixed to the rear wall 64.

Furthermore, the location of the universal joint 52 is preferably closer to the plane of the lateral wall 24 than to the lateral wall 25 as shown in FIG. 7 so that less displacement of the piston 48 is required. One of the main objects of the particular orientation of the piston 48 as previously described, is to create as little obstruction over the opening of the box body between the peripheral walls when the box body 12 is loaded through the cover as explained later.

Figures 6, 10, 11:
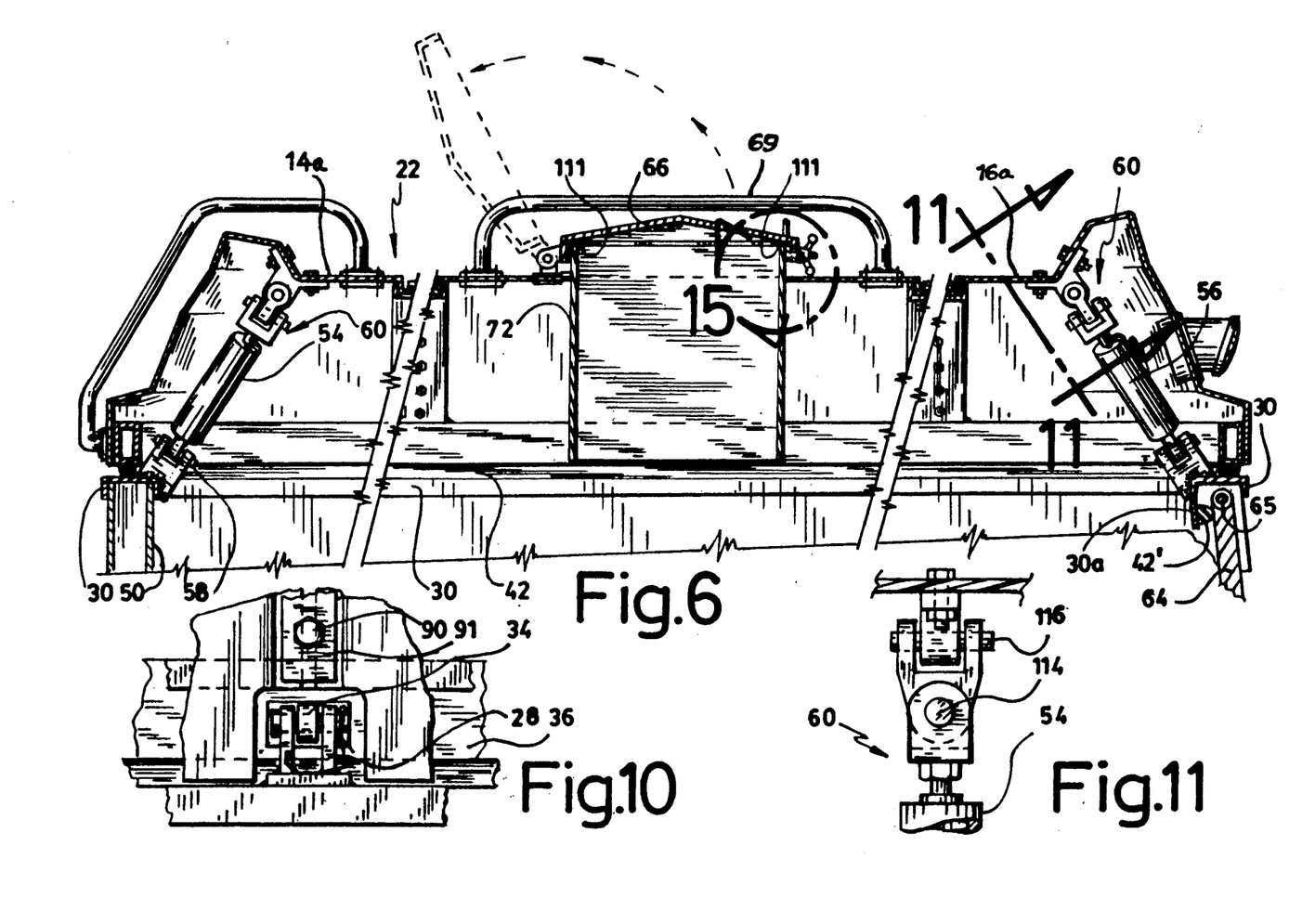
FIG. 6 is a longitudinal cross-sectional view of the cover taken along line 6—6 of FIG. 2.
FIG. 10 is a side view along arrow 10 shown in FIG. 9 illustrating a pivoting arrangement of the cover assembly.
FIG. 11 is a side view taken along line 11—11 shown in FIG. 6.

FIG. 6 shows a longitudinal sectional view of the cover assembly which is opened by a front piston 54 and a rear piston 56. The positioning of the pistons 54 and 56 is substantially similar to the one explained relative to FIGS. 7 and 7a. Piston 54 is secured at its lower end to the bracket 30 through a pivotal arrangement 58 adjacent the front wall 50. The upper end of the piston 54 is also connected to the front module 14a of the lid 22 by a universal joint 60 at a location on the lid 22 which is close to the plane of the front wall 50 and which is relatively close to the lateral wall 25.

The positioning of the piston 56 relative to the rear wall 64 and the lid 22 is similar to the one explained relative to the piston 54. It sits on the bracket 30 having a flange 30a provided with a seal 42a on which abuts the rear wall 64. The universal joint 60 connected to piston 56 is secured to the rear module 14b.

The lid 22 shown in FIG. 5, is provided with a plurality of central doors 66 which provides access to the box body 12 over the central axis of the latter and with lateral doors 68 disposed on each side of the central doors 66. The doors 66 and 68 are used for loading the box body with granular material without lifting the lid. The lateral doors are hingedly mounted about a hinge 70 (FIG. 5) adjacent the central door 66 and are adapted to open as shown in dotted lines in FIG. 5 to provide access from the lateral walls 24 and 25 (FIG. 5). A tubular chute 72 extends below the central door 66 down to the level of the bracket 30 so that when the box body 12 is loaded with granular material, the level of the box body will not exceed the upper edge of the peripheral walls of the box body. The central doors 66 are also pivotingly mounted about hinges 77 (FIG. 5). Handrails 67 and 69 are provided about the doors 66 and 68 respectively to offer to workers a secure access to all parts of the surface of the lid.

Figures 5A, 9, 9A:
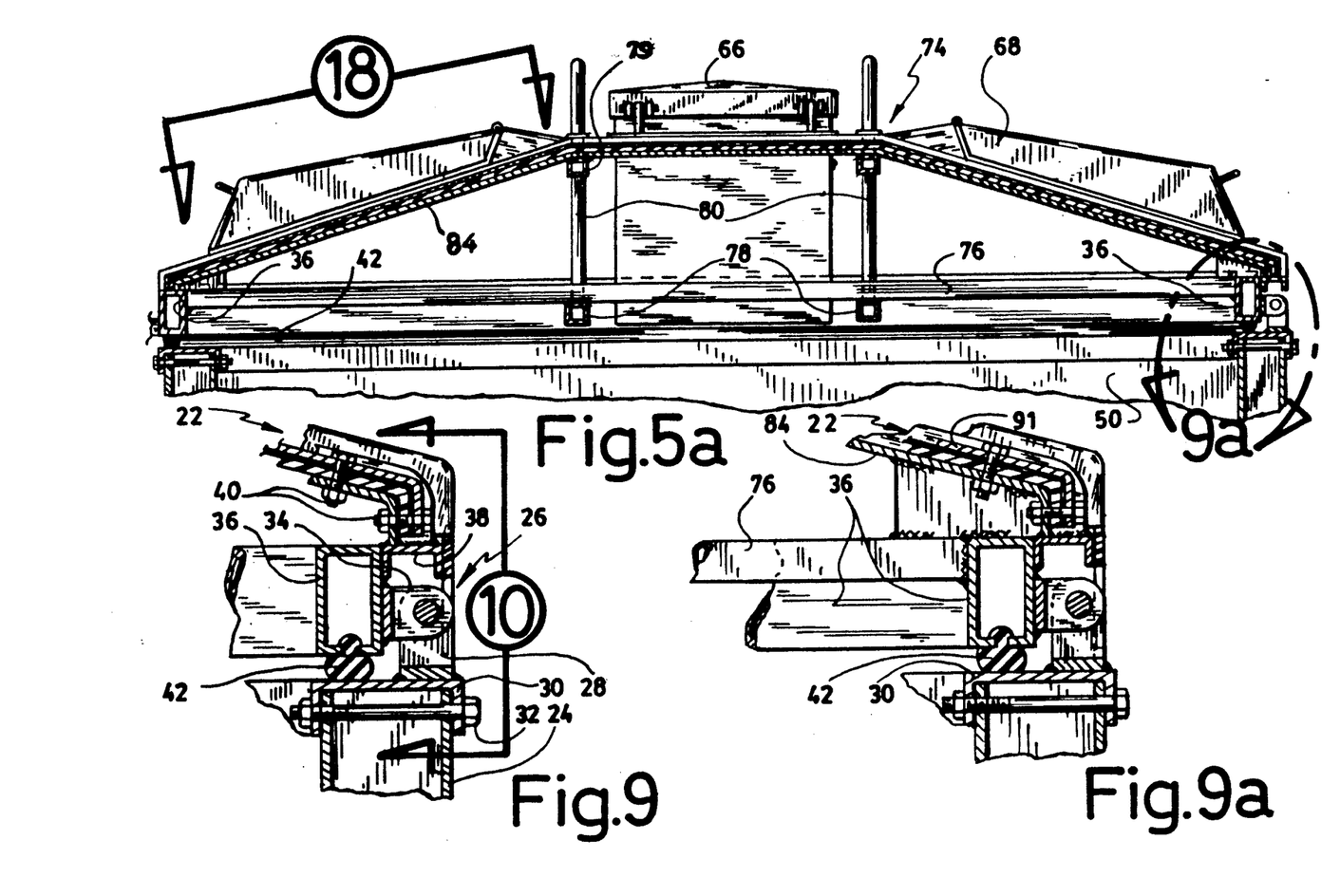
Figure 22:
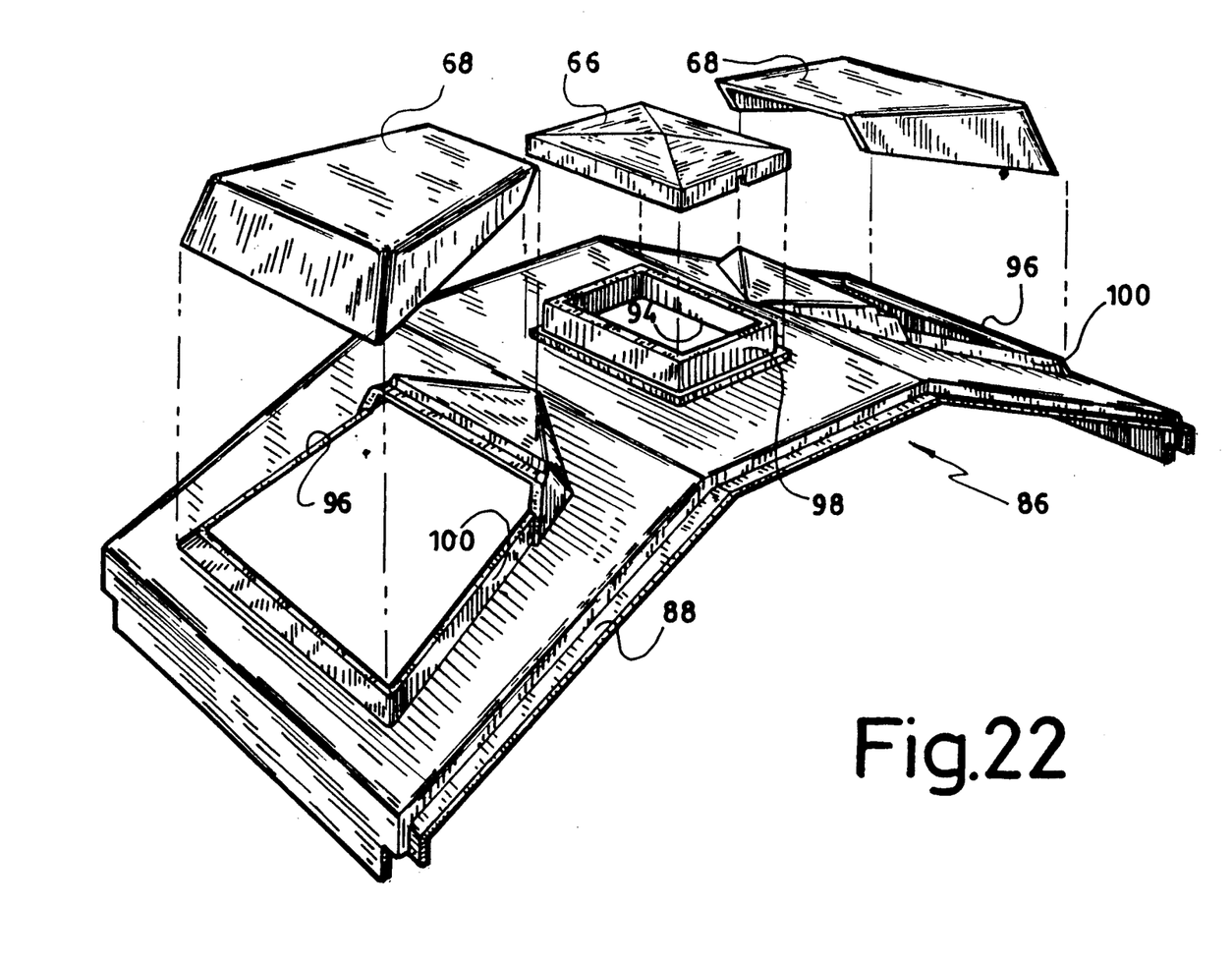
FIG. 22 is a perspective view of an intermediate module of the cover according to the invention.
Figure 23:
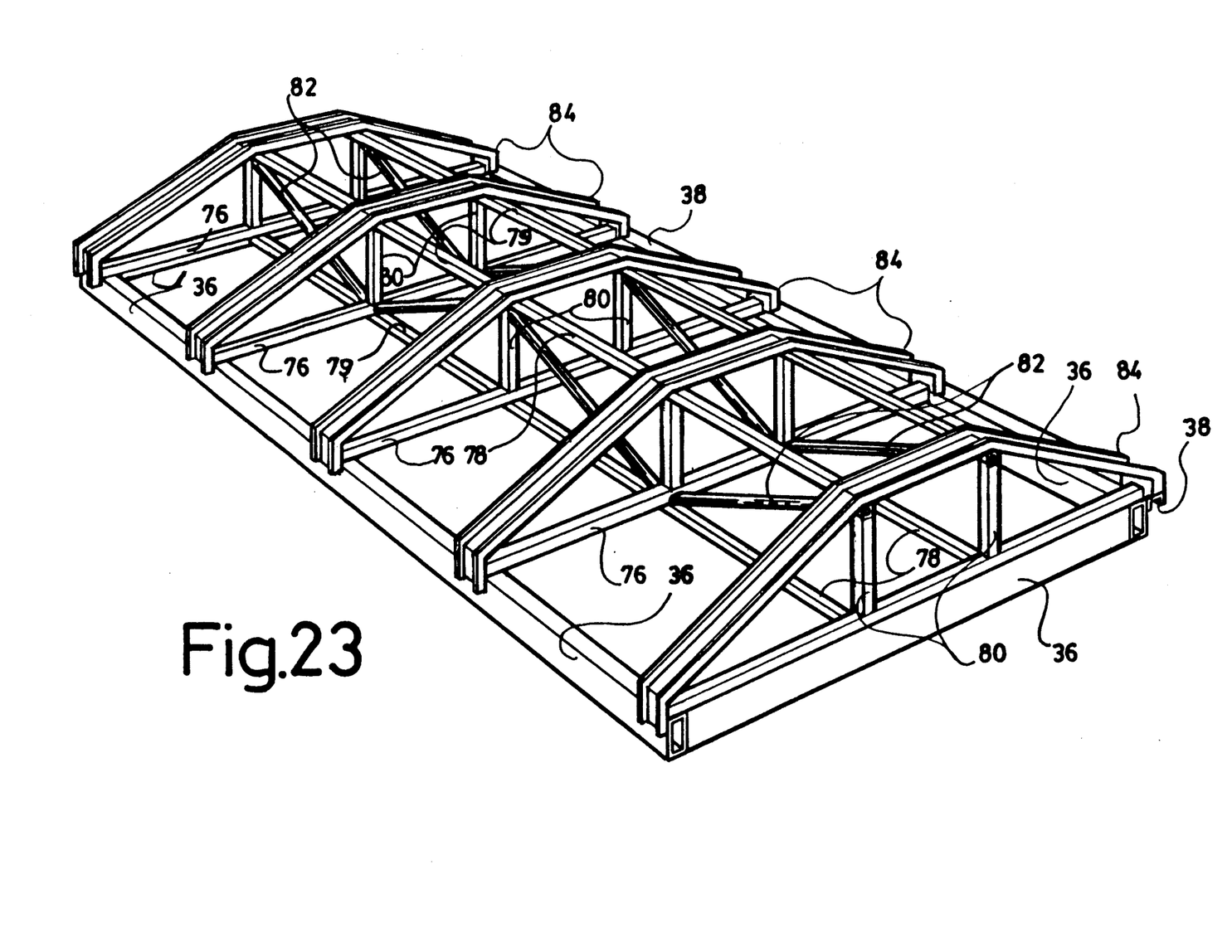
FIG. 23 is a perspective view of a framework for reinforcing the cover according to the invention.

An alternative embodiment of the one illustrated in FIG. 5, wherein the structure of the lid is reinforced is illustrated in FIGS. 5a and 23. The structure of the lid shown in FIG. 5a is substantially similar to the one shown in FIG. 5 but the lid 74 (FIG. 5a) is reinforced with horizontal transversal beams 76 and a pair of longitudinal beams 78. The beams 76 and 78 are located on a plane substantially corresponding to the plane of the frame 36 and are welded to the latter at their extremities. The combination of the beam 76 and 78 are connected at their intersection to an upper structure by vertical beams 80 and inclined beams 82. The upper structure of the cover assembly is formed by a plurality of arch-shaped beams 84 (FIG. 23) supported by the vertical beams 80 and longitudinal beams 79. The arch-shaped beams 84 are adapted to support intermediate modules 86 as shown in FIG. 22. Each side of the modules 86 is provided with flanges 88 which are adapted to sit in arch-shaped beams 84 having a U-shaped cross-section, as shown in FIG. 8 and to be clamped thereto by bolts 90 over a strip of metal 91. A sealing strip 92 located at the junction of adjacent flanges 88 and strip metal 91 will prevent the introduction of water inside the box body and will also prevent the emanation of any undesirably odors. The lid 22 comprises a plurality of modules such as 86 shown in FIG. 22. Each one is provided with a central opening 94 and lateral openings 96, the latter being slanted towards the lateral walls 24 and 25. The openings 94 and 96 are built with an upstanding peripheral flange 98 and 100 respectively to receive their respective covers 66 and 68 (FIG. 22). Such an arrangement also prevents the introduction of water inside the box body 12.

Considering that box bodies may be of various lengths, it is possible to fit a corresponding number of intermediate modules. Further, longitudinal adjustment is made by narrowing the spacing between the modules inside the beams 84.

Figure 15:
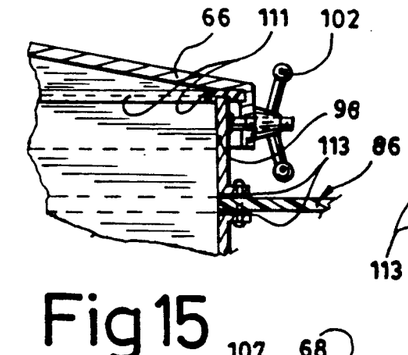
FIG. 15 is an enlarged view of encircled portion 15 shown in FIG. 6.
Figure 16:
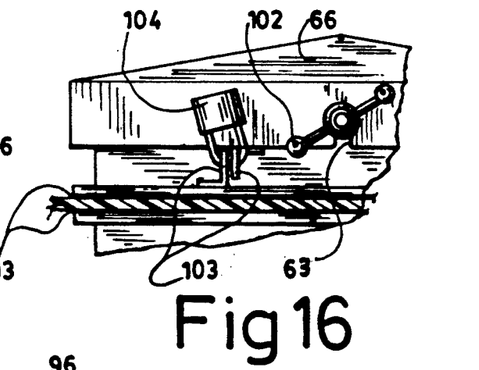
FIG. 16 is a right-hand side view of closing arrangements shown in FIG. 15.
Figure 17:
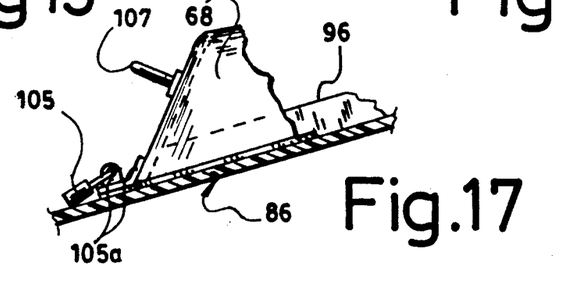
FIG. 17 is an enlarged view of the encircled portion 17 shown in FIG. 5.

The central doors, as illustrated in FIGS. 15 and 16, are locked on the central opening by a wing nut 102 fitting into a slot 63 adapted to releasably open the door 66. A padlock 104 may also be used to more permanently lock the door onto the lid. The same permanent locking arrangement is provided for the lateral doors by using a padlock 105 (FIG. 17) connected to the module 86 per se. A handle 107 is fixed on the lateral portion of the lateral doors (FIG. 17) to lift the latter.

Figures 18, 19, 19A:
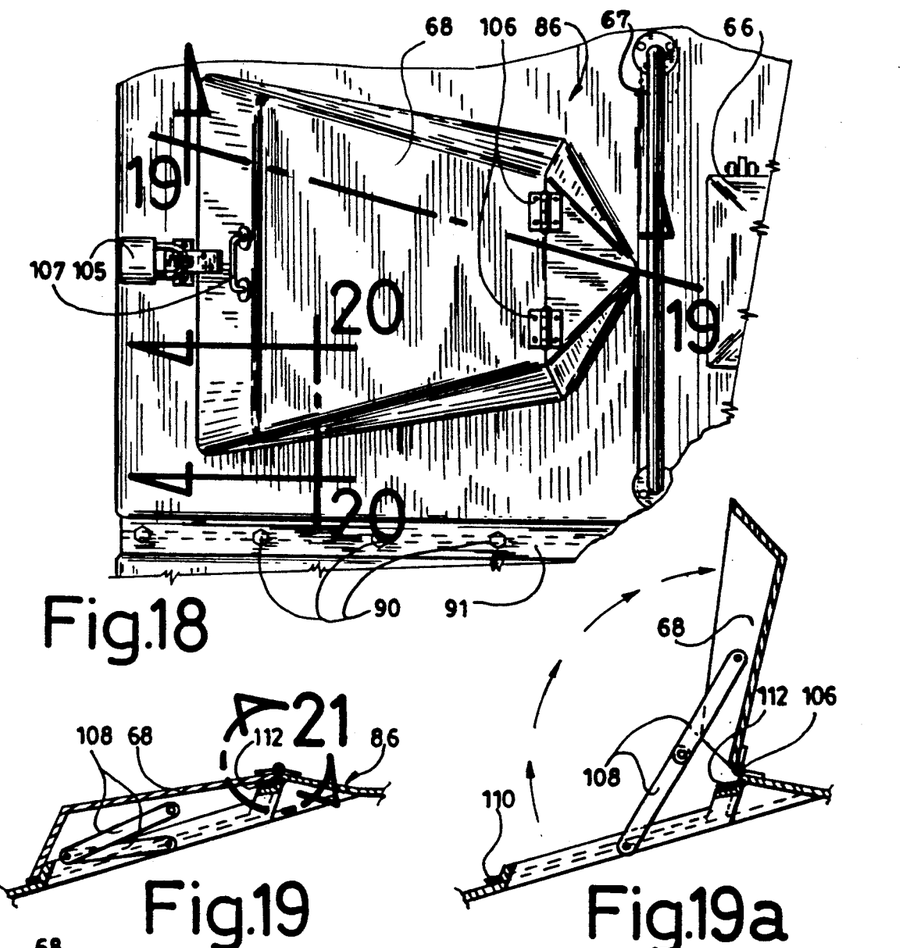
Figure 20:
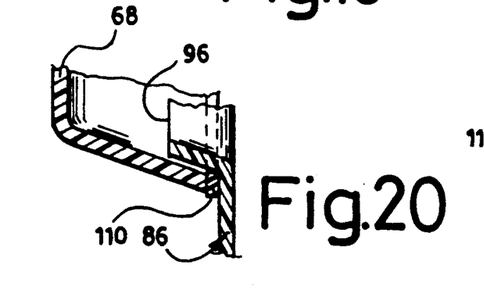
FIG. 20 is a cross-sectional view taken along line 20—20 of FIG. 18.
Figure 21:
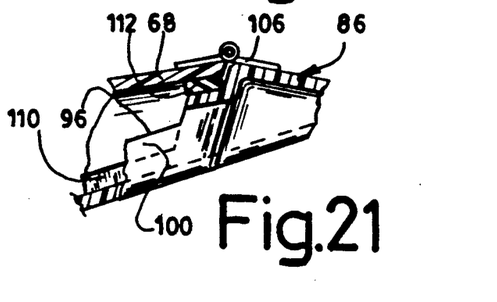
FIG. 21 is an enlarged view of encircled portion 21 shown in FIG. 19.

The doors are also preferably sealed to prevent the passage of water, air and odors in the manner illustrated in FIGS. 19, 19a, 20 and 21. The lateral door 68 is hingedly mounted on the module by a pair of hinges 106 and is preferably restricted to open within an angular limit as shown in FIG. 19a by a pair of articulated arms 108 which can lock the door 68 in an open position. A pair of sealing strips 110 and 112 is mounted between the cover 68 and the core of the module 86 to exclude any undesirably infiltration inside the box body. Sealing trips 111 and 113 are also used around the central doors 66 for the same purpose.

The universal joint 60 mentioned previously and used to raise the lid is particularly illustrated in FIG. 11. The joint 60 has a double articulation at 90 degrees about axles 114 and 116 which allow a pivoting action along a longitudinal and a transversal axis of the box body to take into consideration the orientation of the pistons 54 and 56 which are not exclusively directed into a transversal axis or a longitudinal axis of the box body 12.

Figures 6A, 12, 13:
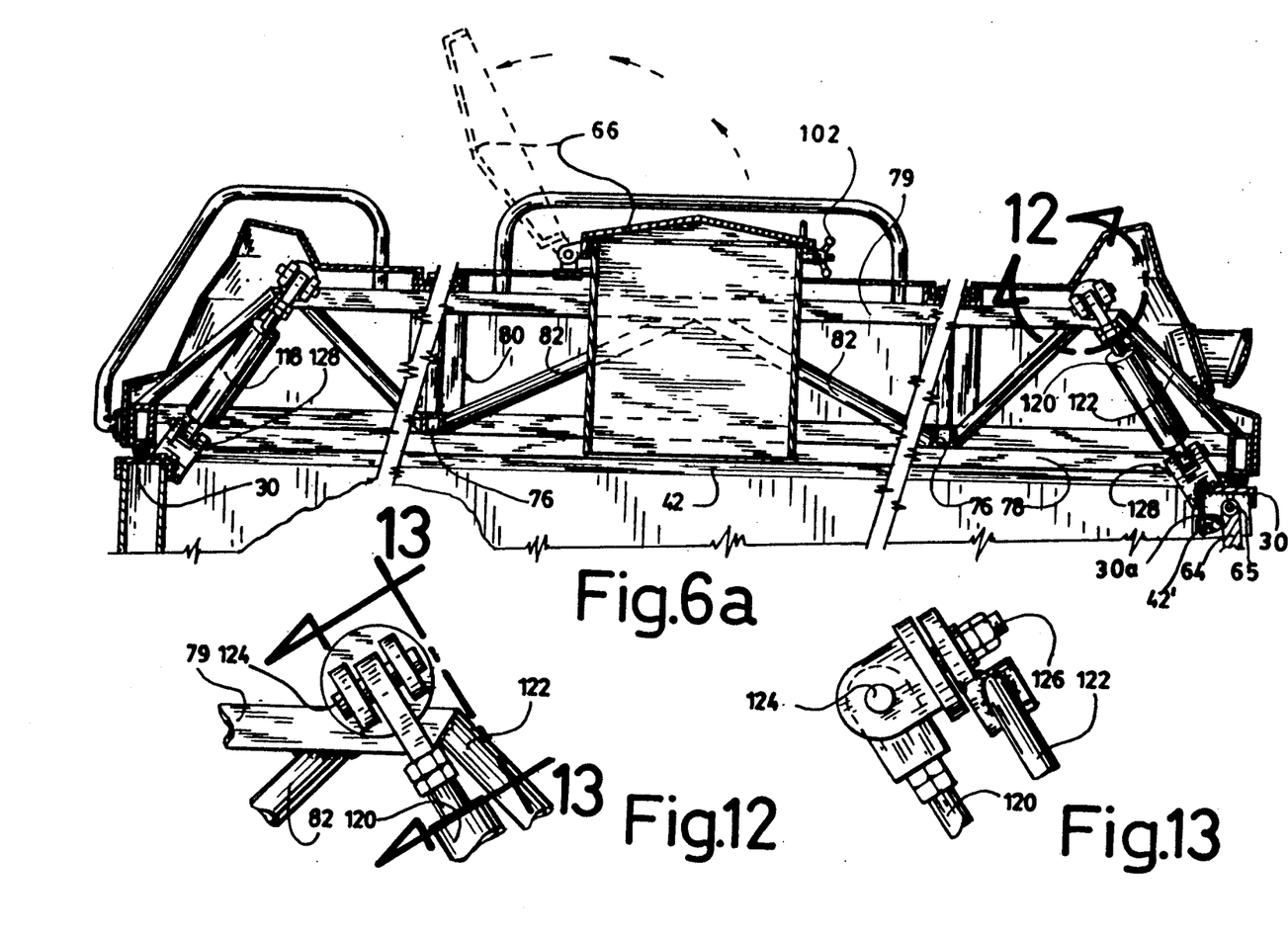

An alternative embodiment of FIG. 6 is shown in FIG. 6a which is provided with a reinforcing structure as explained previously and particularly shown in FIGS. 5a and in FIG. 23. The pistons 118 and 120 are articulated to the structure supporting the lid at their upper end by a modified double axle joint as particularly illustrated in FIGS. 12 and 13.

The lid which is supported by a reinforced structure, as shown in FIG. 6a, is raised by a pair of pistons 118 and 120 which are secured at their lower end to the upside down U-shape bracket 30 and at upper end to the reinforced structure and in particular to inclined beam 122. The piston 120 is connected to a transversal axle 124 which is itself inclined relative to a longitudinal axle 126 (see FIGS. 12 and 13), the latter being supported by the beam 122. The piston 120 being articulated about the axle 128 at its lower end and about the double jointed axles 124 and 126 at the upper end, the cover assembly 10 can be lifted to provide the desirable access inside the box body. The lifting of the cover assembly illustrated in FIGS. 6 and 6a preferably reaches an angle of about 90 degrees which is a level comensurate with the one illustrated in the FIG. 7a.

Figure 14:
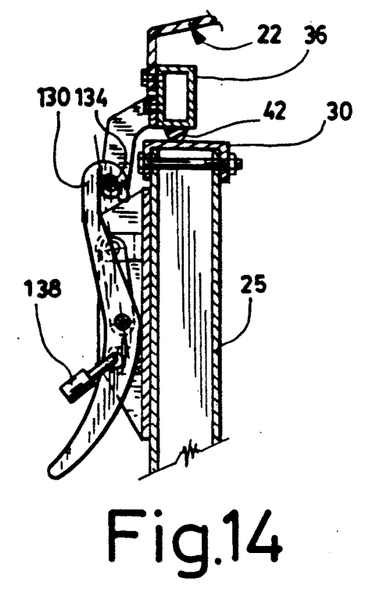
FIG. 14 is a cross-sectional view taken along line 14—14 of FIG. 3 showing a locking arrangement of the cover.
Figure 14A:
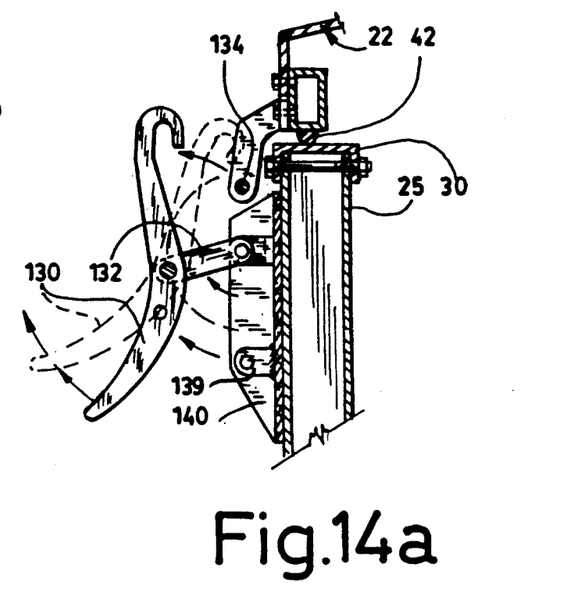
FIG. 14a is an illustration corresponding to FIG. 14 showing the locking device in an open position.

When the cover assembly is closed over the truck body or a stationary open top box, it is locked on the truck panel by a locking arrangement extending over a lateral wall such as illustrated in FIGS. 14 and 14a. A clamping arrangement comprising a clamp 130 pivotally connected to the wall 25 by a link 132 is located to hook onto a gripping rod 134 which is secured to the lateral side of the cover and in particular to the peripheral beam 36. The clamp 130 is provided with a hooking portion 136 which engages the gripping rod 124 when the link 132 and the clamp 130 are pulled downwardly as shown in FIG. 14a. This clamping arrangement is dimensioned so as to increase the sealing effect of the seal 42. A more positive locking of the cover assembly 22 on the box body is provided by a padlock 138 locking the clamp 130 to the sidewall 25.

It should be understood that although pistons have been used to describe the means for raising the lid, various types of lifting jacks should be considered within the embodiment of the invention and within the meaning of the word "piston".

I claim:

1. A rigid cover assembly for use on an open top box body adapted to carry loose goods, and having a surrounding wall including two upstanding end walls and two upstanding lateral walls each provided with an upper edge, said cover assembly comprising,
    an elongated bracket adapted to sit on and be fixed to said upper edges of said surrounding wall, said bracket having a substantially upside down U-shape for straddling said upper edges,
    a peripheral frame mounted above said surrounding wall and substantially in line with said bracket,
    a hinge member secured to a portion of said elongated bracket located over one of said lateral walls and to at least a portion of said frame disposed above said bracket above said one of said lateral walls,
    an elongated dome-shape lid mounted over and secured to said frame, said lid extending above said frame for closing said top box body,
    at least one tilted piston device connected at one end to an inner portion of said lid and at the other end to a portion of said bracket above one of said end walls of the box body, said piston device disposed inside said lid across a corner of said lid and above said box body for pivoting said lid about said hinge member and for raising and lowering said lid,
    whereby the lid is adapted to open and close the box body upon actuation of said piston device, said piston device being located in said lid when the latter is closed over said box body.

2. A cover assembly as recited in claim 1, wherein said lid is provided with a plurality of central openings axially aligned between said lateral walls, a door hingedly and sealingly mounted over each of said openings, said doors adapted to provide access to said box body.

3. A cover assembly as recited in claim 2, wherein said lid comprises a plurality of lateral doors adjacently mounted about each side of central doors, said doors being sealingly and removably mounted on said lid.

4. A cover assembly as recited in claim 1, comprising a sealing ring disposed between said bracket and said frame, said sealing ring adapted to be squeezed by said lid when said lid is closed over said box body.

5. A cover assembly as recited in claim 4, wherein said lid comprises a plurality of adjacent, transversal modules extending from one of said lateral walls to the other lateral wall, means for sealingly securing said modules side by side for allowing said modules to raise together.

6. A cover assembly as recited in claim 3, wherein said lateral doors are hingedly mounted on said lid about axes adjacent said central doors, said lateral doors being mounted on portions of said lid sloping away from said downwardly axes.

7. A cover assembly as recited in claim 6, comprising hand rails secured on the lid on each side of said central doors, said rails extending above the lid for allowing a person working around the central and lateral doors to grab them.

8. A cover assembly as recited in claim 5, wherein said dome-shaped lid comprises a framework including a plurality of transversal arched beams supporting said adjacent modules, and a plurality of longitudinal and transversal linear beams for supporting said arched beams, said arched beams and said transversal beams being secured to said peripheral frame.

9. A cover assembly as recited in claim 4, comprising locking means fixed to a portion of said peripheral frame located opposite said hinge member and to a portion of said lateral wall disposed below said portion of the peripheral frame for maintaining said sealing ring tightly squeezed.

10. A cover assembly as recited in claim 8, wherein said piston device is linear and is articulatedly secured at one end to a portion of said bracket mounted on one of said end walls adjacent said hinge member, and the other end of said piston device is articulatedly secured to the lid at a location intermediate both end walls and both lateral walls.

* * * * *